US011070366B2

(12) United States Patent
Soriente et al.

(10) Patent No.: US 11,070,366 B2
(45) Date of Patent: Jul. 20, 2021

(54) DYNAMIC ANONYMOUS PASSWORD-AUTHENTICATED KEY EXCHANGE (APAKE)

(71) Applicant: NEC Laboratories Europe GmbH, Heidelberg (DE)

(72) Inventors: Claudio Soriente, Madrid (ES); Maria Isabel Gonzalez Vasco, Madrid (ES); Angel Luis Perez del Pozo, Madrid (ES)

(73) Assignee: NEC CORPORATION, Tokyo (JP)

( * ) Notice: Subject to any disclaimer, the term of this patent is extended or adjusted under 35 U.S.C. 154(b) by 352 days.

(21) Appl. No.: 16/239,564

(22) Filed: Jan. 4, 2019

(65) Prior Publication Data

US 2019/0349191 A1   Nov. 14, 2019

Related U.S. Application Data

(60) Provisional application No. 62/668,342, filed on May 8, 2018.

(51) Int. Cl.
*H04L 9/08* (2006.01)
*H04L 29/06* (2006.01)
(Continued)

(52) U.S. Cl.
CPC .......... *H04L 9/0838* (2013.01); *H04L 9/0643* (2013.01); *H04L 9/0861* (2013.01);
(Continued)

(58) Field of Classification Search
None
See application file for complete search history.

(56) References Cited

U.S. PATENT DOCUMENTS

| | | | | |
|---|---|---|---|---|
| 2001/0009583 A1* | 7/2001 | Murakami | ............ | H04L 63/083 380/278 |
| 2002/0002674 A1* | 1/2002 | Grimes | ............... | H04L 63/0823 713/156 |
| 2003/0233550 A1* | 12/2003 | Brickell | ................ | H04L 9/0841 713/171 |

OTHER PUBLICATIONS

Duong Qang Viet, et al., "Anonymous Password-Based Authenticated Key Exchange", International Conference on Cryptology in India, Dec. 2005, pp. 244-257.
(Continued)

*Primary Examiner* — William J. Goodchild
(74) *Attorney, Agent, or Firm* — Leydig, Voit & Mayer, Ltd.

(57) ABSTRACT

A method for anonymous authentication and key establishment based on passwords (APAKE), includes instantiating, by the server, an OPRF scheme and a symmetric encryption scheme; engaging in, by the client and the server, an OPRFEvaluate protocol so that the client learns a decryption key associated with its password while the server learns nothing; securely transferring, by the server, a nonce and a symmetric encryption key to the client if the client holds a valid password; sending, by the client, its nonce encrypted under the symmetric encryption key; using, by the server, the symmetric encryption key to decipher ciphertext received by virtue of the sending, by the client, its nonce encrypted under the symmetric encryption key and to recover the client's nonce; and computing, by the server and the client, a compute key based on the client's nonce and the server's nonce.

15 Claims, 3 Drawing Sheets

(51) Int. Cl.
  *H04L 9/14* (2006.01)
  *H04L 9/06* (2006.01)
(52) U.S. Cl.
  CPC ............ *H04L 9/14* (2013.01); *H04L 63/0435* (2013.01); *H04L 63/061* (2013.01); *H04L 2209/08* (2013.01); *H04L 2209/50* (2013.01)

(56) References Cited

OTHER PUBLICATIONS

Jing Yang, et al., "A New Password-Based Authenticated Key Exchange Protocol", International Conference on Cryptology in India, Dec. 2008, pp. 200-212.

Yanjiang Yang, et al., "A New Approach for Anonymous Password Authentication", 2009 Annual Computer Security Applications Conference, Dec. 7-11, 2009, pp. 1-10.

Yanjiang Yang, et al., "Towards Practical Anonymous Password Authentication", ACSAC '10, Dec. 6-10, 2010, pp. 59-68.

Zhenfeng Zhang, et al., "Practical Anonymous Password Authentication and TLS with Anonymous Client Authentication", CCS' 16, Oct. 24-28, 2016, pp. 1179-1191.

ISO/IEC 20009-4:2017, "Information technology—Security techniques—Anonymous entity authentication—Part 4: Mechanisms Based on Weak Secrets", Aug. 2017, abstract.

Michael J. Freedman, et al., "Keyword Search and Oblivious Pseudorandom Functions", Theory of Cryptography Conference, Dec. 2005, pp. 303-324.

Vladimir Kolesnikov, et al., "Practical Multi-party Private Set Intersection from Symmetric—Key Techniques", CCS '17, Oct. 30-Nov. 3, 2017, pp. 1257-1272.

Pascal Paillier, "Public-Key Cryptosystems Based on Composite Degree Residuosity Classes", EUROCRYPT '99, Dec. 1999, pp. 223-238.

Jonathan Katz, et al., "Round-Optimal Password—Based Authenticated Key Exchange", Journal of Cryptology, vol. 26, Dec. 4, 2012, pp. 714-743.

Seonghan Shin, et al., "Anonymous Password-Authentication Key Exchange: New Construction and Its Extensions", IEICE Transactions on Fundamentals of Electronics, Communications and Computer Sciences, vol. 93. A, issue 1, Dec. 2010, abstract.

* cited by examiner

DYNAMIC ANONYMOUS PASSWORD-AUTHENTICATED KEY EXCHANGE (APAKE)

CROSS REFERENCE TO RELATED APPLICATION

This application claims benefit to U.S. Provisional Patent Application No. 62/668,342, filed May 8, 2018, which is hereby incorporated by reference herein.

FIELD

The present invention relates to authentication, and more specifically to authentication and key establishment using passwords.

BACKGROUND

Password-Authenticated Key Exchange (PAKE) allows two parties to establish a strong cryptographic key, given knowledge of a common low-entropy password (see, e.g., Mihir Bellare, David Pointcheval, and Phillip Rogaway; Authenticated Key Exchange Secure Against Dictionary Attacks; In Bart Preneel, editor, *Advances in Cryptology— EUROCRYPT* 2000, volume 1807 *of Lecture Notes in Computer Science*, pages 139-155. Springer, 2000. and Steven M. Bellovin and Michael Merritt; Encrypted key exchange: password-based protocols secure against dictionary attacks; In 1992 *IEEE Computer Society Symposium on Research in Security and Privacy*, Oakland, Calif., USA, May 4-6, 1992, pages 72-84, 1992). Most PAKE protocols assume a peer-to-peer scenario where each party holds one password. Client-server settings have been studied in so-called verifier-based PAKE (see, e.g., Steven M. Bellovin and Michael Merritt; Augmented encrypted key exchange: A password based protocol secure against dictionary attacks and password file compromise; In Dorothy E. Denning, Raymond Pyle, Ravi Ganesan, Ravi S. Sandhu, and Victoria Ashby, editors, *CCS '93, Proceedings of the* 1*st ACM Conference on Computer and Communications Security*, Fairfax, Va., USA, Nov. 3-5, 1993, pages 244-250; ACM, 1993 and Fabrice Benhamouda and David Pointcheval; Verifier-based password-authenticated key exchange: New models and constructions; *IACR Cryptology ePrint Archive*, 2013:833, 2013). In such client-server settings, the client has one password and one or more servers share a password database. The main design concern in these constructions is to mitigate password leaks after server compromise (e.g., by secret-sharing the password database among several servers).

In the client-server scenario, Anonymous PAKE (APAKE)—which has received great attention in recent years—provides authentication, key establishment, and anonymity at the same time. APAKE can be seen as the hybrid offspring of standard key exchange and anonymous password authentication protocols. APAKE allows a client holding a low-entropy password to establish a session key with a server, provided that the client's password is in the server's set. Moreover, no information about the password input by the client or the set of valid passwords held by the server should leak to the other party—apart from whether the client's password lies or not in the server's password database. Given a client with password p and a server with password database $D_S$, APAKE ensures that the two parties establish a key only if $p \in D_S$. In this setting, anonymity is defined with respect to the password(s) held by the two parties. Client anonymity guarantees that the server cannot tell the client's password among the ones in $D_S$. Similarly, server anonymity ensures that no information on $D_S$ is leaked to the client. Both parties learn whether $p \in D_S$ or not. Also, the size of the password database is usually considered admissible leakage.

APAKE is relevant in scenarios where both authenticity and anonymity are required. For example, anonymous authentication to a Wi-Fi provider may mitigate leak-age of mobility patterns that are normally revealed when a user connects from different APs over time (see Aldo Cassola, Erik-Oliver Blass, and Guevara Noubir; Authenticating privately over public wi-fi hotspots; In *Proceedings of the 22nd ACM SIGSAC Conference on Computer and Communications Security*, Denver, Colo., USA, Oct. 12-16, 2015, pages 1346-1357, 2015). Similarly, in an anonymous climate survey, employees of a company may answer by anonymously logging into the server where the survey application is hosted. In all of the mentioned scenarios, APAKE must be combined with other privacy-enhancing tools to achieve anonymity at all layers of the communication stack. For example, IP addresses should be hidden via TOR (https://torproject.org) or MAC addresses should be anonymized using, e.g., randomized MACs (see Jeremy Martin, Travis Mayberry, Collin Donahue, Lucas Foppe, Lamont Brown, Chadwick Riggins, Erik C. Rye, and Dane Brown; A study of MAC address randomization in mobile devices and when it fails; *PoPETs*, 2017(4):365-383, 2017). Yet, APAKE is key to achieve anonymity at the authentication layer. This has been recognized by industry and regulators, as APAKE protocols are currently being standardized (see ISO/IEC 20009-4:2017 Anonymous entity authentication; Part 4: Mechanisms based on weak secrets; Technical report, ISO/IEC JTC 1/SC 27, 2017).

State-of-the-art APAKE protocols can be classified as credential-wrapping APAKE and "password-only" APAKE. In credential-wrapping APAKE protocols, client storage is assumed. The availability of storage allows clients to store password-wrapped anonymous credentials (see, e.g., Jan Camenisch and Anna Lysyanskaya; A signature scheme with efficient protocols; In *Security in Communication Networks (SCN)*, pages 268-289, 2002). In credential-wrapping APAKE, the password is used to encrypt an anonymous credential, i.e., a cryptographic object that ensures authentication and anonymity. Knowledge of the right password, allows the client to unwrap the credential and use it in an anonymous credential show to the server (see, e.g., Yanjiang Yang, Jianying Zhou, Jian Weng, and Feng Bao; A new approach for anonymous password authentication; In *Annual Computer Security Applications Conference (ACSAC)*, pages 199-208, 2009; see also Yanjiang Yang, Jianying Zhou, JunWenWong, and Feng Bao; Towards practical anonymous password authentication; In *Annual Computer Security Applications Conference (ACSAC)*, pages 59-68, 2010 and Zhenfeng Zhang, Kang Yang, Xuexian Hu, and Yuchen Wang; Practical anonymous password authentication and TLS with anonymous client authentication; In *ACM SIGSAC Conference on Computer and Communications Security (CCS)*, pages 1179-1191, 2016). Credential-wrapping PAKE is therefore fairly efficient. In particular, the protocol complexity with respect to communication and computation is independent of the size of the password database. The problem with credential-wrapping APAKE is that the encrypted credential must be stored either on private storage media (e.g., a USB key), or in cloud storage. Using private storage media hampers the ubiquity of the solution since the client must have the storage medium available in order to authenticate to the other party. Using cloud storage, the client may face issues including theft, loss, corruption, or unavailability of the credential. Therefore, the widespread adoption of credential-wrapping APAKE may be hampered by its storage requirements.

"Password-only" APAKE is less efficient that credential-wrapping APAKE. In particular, the protocol complexity in terms of communication and computation is at best linear in the size of the password database. However, "password-only" APAKE does not require the client to store an anonymous credential an, as a result, has improved usability. To date, "password-only" APAKE protocols have been based on Oblivious Transfer (OT), a technique that allows a client to fetch the i-th message out of n messages held by a server in such a way that (1) the server does not learn the index i of the message retrieved by the client, and (2) the client does not learn anything of the remaining n−1 messages. In "password-only" APAKE protocols based on OT, the server and client contribute random values that eventually determine the final key. The server prepares a set of n ciphertexts where each ciphertext is computed by encrypting the server's random contribution to the final key with one of the valid passwords. The client uses OT to fetch the i-th ciphertext from the server. Hence, by using its password, the client can decrypt the fetched message and recover the server's contribution to the key. From this state, the key establishment follows a standard (e.g., Diffie-Hellman based) key establishment. However, as such "password-only" APAKE protocols require the client to hold both a password and an "index" pointing at a matching entry from the password database at the server, they are not truly password only. Requiring a client to remember an index (apart from its passwords) clearly deviates from the fundamental password only assumption of PAKE. Furthermore, reliance on a fixed index that identifies a client among the set of registered ones, may impede dynamic management of client data at the server (e.g., when a client leaves the system and indices of remaining clients must be updated). Specifically, deleting clients (and their passwords) is not feasible since deleting a password at index i requires decreasing by one the indices of all passwords at positions greater than i.

SUMMARY

In an embodiment, the present invention provides a method for anonymous authentication and key establishment based on passwords (APAKE), wherein a server has a set of valid passwords and a client holds one such password. The method includes instantiating, by the server, an oblivious pseudo-random function (OPRF) scheme and a symmetric encryption scheme; engaging in, by the client and the server, an OPRFEvaluate protocol so that the client learns a decryption key associated with its password while the server learns nothing; securely transferring, by the server, a nonce and a symmetric encryption key to the client if the client holds a valid password, wherein the server encrypts its nonce and symmetric key using all valid passwords as seeds to compute the encryption keys, and the client uses the decryption key associated with its password to decrypt the server's nonce and the symmetric encryption key; sending, by the client, its nonce encrypted under the symmetric encryption key; using, by the server, the symmetric encryption key to decipher ciphertext received by virtue of the sending, by the client, its nonce encrypted under the symmetric encryption key and to recover the client's nonce; and computing, by the server and the client, a key based on the client's nonce and the server's nonce.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
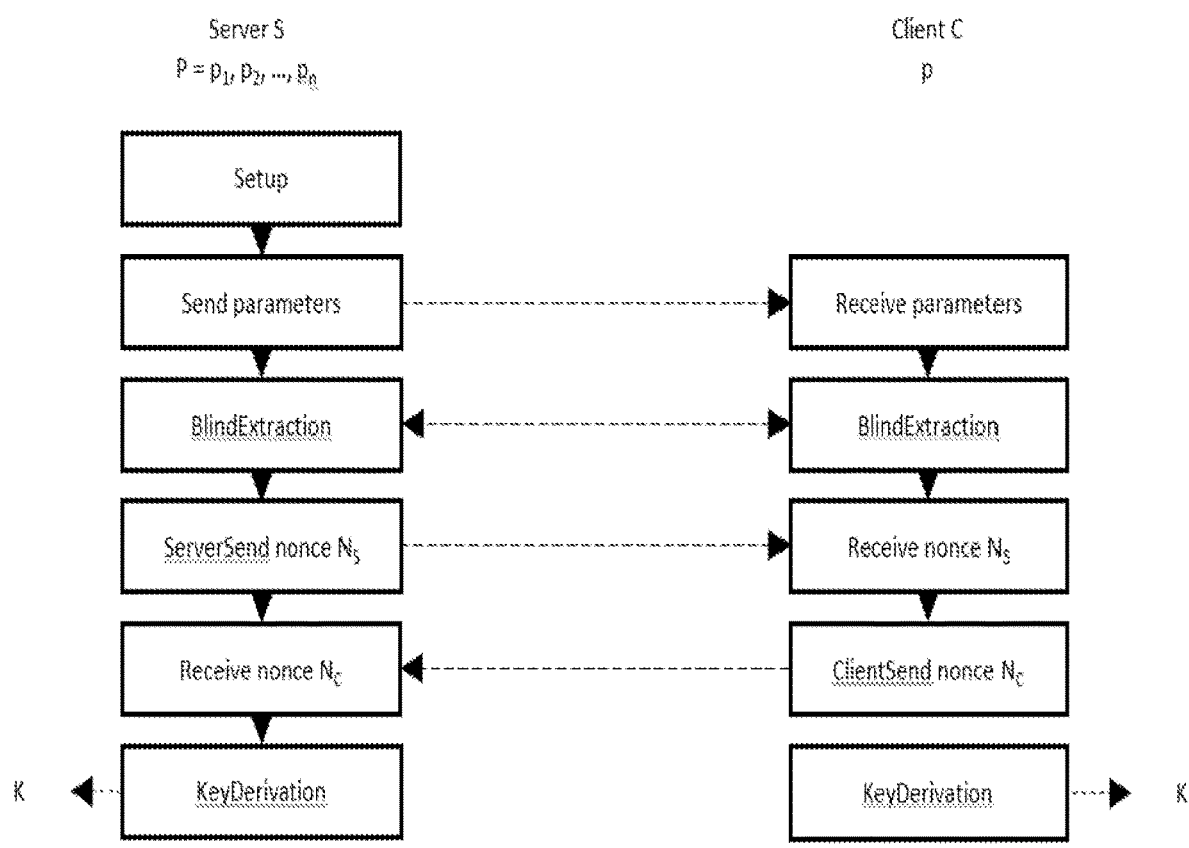
FIG. 1 depicts the steps of the authentication and key establishment protocol.

Embodiments of the invention provide a formal security model for APAKE, capturing security and anonymity provisions for both clients and servers. Embodiments of the invention provide APAKE protocols that only require clients to remember a password and that attain key secrecy and anonymity guarantees. Embodiments of the invention rely upon oblivious pseudo-random functions, while other embodiments of the invention rely upon oblivious programmable pseudo-random functions, while still other embodiments of the invention build upon a special type of identity-based encryption scheme, and specifically an identity-based encryption scheme relying on smooth projective hash functions (SPHFs).

Embodiments of the present invention provide significant advantages over prior art "password only" APAKE protocols. As discussed above, prior-art "password only" APAKE protocols require the client to know an index of its password in a password database of a server. This requirement has two major shortcomings.

The first shortcoming is related to account deletion. Assume, for example, that the server has a set P of n authorized users (each with his own password). Assume, in addition, that client Alice is the i-th user in the system, i.e., Alice uses index i in the OT step of the APAKE protocol. If client Bob with index j<i leaves the system, the server must choose one out of the following two options. One option is to let all clients with indices in [j+1, . . . , n] know that their index i should be updated to i−1. This may be difficult to achieve because in an APAKE system, clients are anonymous with respect to the server. Another option is to replace Bob's password with a random string, assuming that no client will pick that particular password. With this option the complexity of running APAKE does not change, despite the password database has reduced its size. Furthermore, even if Bob's password has high entropy, this is still a valid password that an adversary could guess. That is, even if the system only accounts for n−1 clients with valid passwords, there are actually n valid passwords.

The second shortcoming relates to situations where multiple clients have the same password. Assume the server has a set P of n authorized users and that client Alice has password "xyz123" with index i. If client Bob registers and chooses the same password as client Alice, the server must choose one of the following two options. One option is to assign index i to client Bob. The problem with this option is that Bob learns that at least another client has chosen his password. Note that Bob was expecting to be assigned index n+1 since the size of the password database (i.e., n) is leaked to any user during the OT step of the APAKE protocol. Another option is to assign index n+1 to Bob and store the same password (i.e., "xyz123") at index i and at index n+1 in the password database. The problem with this option is that the server does not allow optimization of the protocol complexity despite the fact that there are clients sharing the same password. Recall that the protocol complexity is linear in the size of the password database; the complexity once Bob registers is linear in n+1 despite the fact that there are only n unique valid passwords.

Embodiments of the present invention do not incur the above issues because embodiments of the invention provide password-only APAKE protocols that do not require the user to be aware of an index of a password in a password database. Compared to prior art, embodiments of the invention provide APAKE protocols that allow for higher flexibility in the management of the password database and that leak less information to clients. In particular, the index associated with a client's password in a password database held by a server may be sensitive information that the server wants to keep private. Embodiments of the invention also allow the server to remove passwords (and therefore de-register clients) from the set of valid passwords in a way that is completely transparent to clients. Therefore, when a password is deleted from the database, clients need not to be aware of it and the protocol complexity reduces according to the number of passwords that are deleted. Furthermore, if a new client picks a password already present in the password database, the protocol complexity does not increases.

According to an embodiment, a method is provided for anonymous password-authenticated key exchange (APAKE), wherein a server holds a set of valid passwords and a client holds a password from the set of valid passwords. The method includes defining, by the server, public parameters and a master key and transmitting, by the server to the client, the public parameters. The method further includes engaging, by the server, in an interactive protocol with the client, wherein the interactive protocol involves the public parameters, the master key, and the client password, wherein the interactive protocol enables the client to derive a decryption key associated with its password, and wherein the interactive protocol does not allow the server to identify the client password and does not allow the client to determine the master key, nor any information about the other passwords in the set of valid passwords. In addition, the method includes securely transferring, by the server to the client, an encrypted server nonce and an encrypted symmetric encryption key, wherein the decryption key derived by the client enables the client to decrypt the server nonce and the symmetric encryption key. Furthermore, the method includes receiving, by the server from the client, ciphertext including a client nonce encrypted with the symmetric encryption key, deciphering, by the server by using the symmetric encryption key, ciphertext received from the client to recover the client nonce, and computing, by the client and the server, a compute key based on the client nonce and the server nonce.

According to embodiments, the interactive protocol can be an oblivious pseudo-random function (OPRF) and the public parameters can be generated by a randomized algorithm that partially defines the OPRF. According to alternative embodiments, the interactive protocol can be an oblivious programmable pseudo-random function (OPPRF).

According to embodiments, the symmetric encryption key can be derived from a symmetric encryption scheme defined by a triplet of algorithms. The triplet of algorithms can include a first algorithm that is a randomized algorithm that outputs the symmetric encryption key, a second algorithm that is a randomized algorithm that outputs, based on the symmetric encryption key and the client nonce, the ciphertext, and a third algorithm that is a deterministic algorithm that outputs, based on the symmetric encryption key and the ciphertext, the client nonce.

According to an embodiment, the server computes, for each password in the set of valid passwords, a corresponding password tag by using the master key. The server can map each password tag to the symmetric encryption key using a cryptographic hash function to provide, for each password in the set of valid passwords, a password key. The server can encrypt the server nonce and the symmetric encryption key with each password key to generate, for each password in the set of valid passwords, a ciphertext. The server can initialize an empty associative array, store the ciphertexts in the array, and send the array to the client. The decryption key can be derived by the client to enable the client to decrypt the server nonce and the symmetric encryption key from an index in the array sent by the server.

According to an embodiment, a non-transitory computer readable medium is provided having stored thereon instructions for performing a method for anonymous password-authenticated key exchange (APAKE), wherein a server holds a set of valid passwords and a client holds a password from the set of valid passwords. The method includes defining, by the server, public parameters and a master key and transmitting, by the server to the client, the public parameters. The method further includes engaging, by the server, in an interactive protocol with the client, wherein the interactive protocol involves the public parameters, the master key, and the client password, wherein the interactive protocol enables the client to derive a decryption key associated with the client password, and wherein the interactive protocol does not allow the server to identify the client password and does not allow the client to determine the master key or any other information on the set of valid passwords. In addition, the method includes securely transferring, by the server to the client, an encrypted server nonce and an encrypted symmetric encryption key, wherein the decryption key derived by the client enables the client to decrypt the server nonce and the symmetric encryption key. Furthermore, the method includes receiving, by the server from the client, ciphertext including a client nonce encrypted with the symmetric encryption key, deciphering, by the server by using the symmetric encryption key, ciphertext received from the client to recover the client nonce, and computing, by the client and the server, a compute key based on the client nonce and the server nonce.

According to an embodiment, a server for performing anonymous password-authenticated key exchange (APAKE) is provided. The server includes a memory storing a set of valid passwords, and a processor. The processor is configured to define public parameters and a master key, transmit, to a client storing a password from the set of valid passwords, the public parameters, and engage in an interactive protocol with the client. The interactive protocol involves the public parameters, the master key, and the client password, the interactive protocol enables the client to derive a decryption key associated with the client password, and the interactive protocol does not allow the server to identify the client password nor allow the client to determine the master key. The server is further configured to securely transfer, to the client, an encrypted server nonce and an encrypted symmetric encryption key, wherein the decryption key derived by the client enables the client to decrypt the server nonce and the symmetric encryption key, and receive, from the client, ciphertext including a client nonce encrypted with the symmetric encryption key. The server is further configured to decipher, by using the symmetric encryption key, ciphertext received from the client to recover the client nonce, and compute a compute key based on the client nonce and the server nonce.

Anonymous Pake

In an APAKE system, the server holds a database P with n passwords and a client holds one password p. Client and server engage in an interactive protocol where the server authenticates the client and both establish a cryptographic key if p belongs to P. However, the server does not learn p, nor the client learns any other password in P apart from p. Also, two executions of the authentication protocol are unlinkable, i.e., the server cannot tell whether the clients of the two executions were the same client or not. Prior art "password-only" APAKE protocols assume P to be an ordered set of passwords (i.e., $\{p_1, p_2, \ldots, p_n\}$) and the client to be aware of the index i of its password in P. Embodiments of the present invention provide APAKE protocols that drop this requirement. In an APAKE protocol, the client and the server exchange high-entropy nonces that are used to derive a common cryptographic key. The server's nonce is masked by each of the valid passwords so that only a client with a valid password can recover the nonce. The nonce also provides a key for a symmetric encryption scheme. The client nonce is secured with this key so that only the server can recover the nonce.

A detailed generic description of a password only APAKE protocol is described below. Assuming that the client knows the index i of its password, the APAKE protocol can be easily built on top of OT. Informally, client and server engage in a 1-out-of-n OT protocol; the client's private input is index i while, for $1 \leq j \leq n$, the j-th private input for the server is its random contribution to the final key, say $N_S$, blinded with the j-th password in the database. The client's private output from the OT protocol is $N_S$ blinded with password $p_i$. Hence, the client leverages its password p to unblind $N_S$ and use it to compute the shared key. One could argue that the index i may be computed as a function of the password p, thus doing away with the client requirement of remembering the password index. However, in a 1-out-of-N OT protocol, the client must know the set of "valid" indices (usually, numbers from 1 to N). If passwords are mapped to indices via a public function $f(\ )$, an adversary could easily (and offline) tell if a password p is valid by checking whether $f(p)$ belongs to the set of valid indices. In order to mitigate such an attack, the server may input to the OT protocol all possible passwords, while ensuring that only the ones in the password database allow the client to retrieve $N_S$. Nevertheless, the complexity of the OT protocol—originally linear in the size of the password database at the server—becomes linear in the size of the password dictionary. Therefore, any solution that attempts to construct an OT-based APAKE without the requirement for a client to remember an index, incurs in complexity that is linear in the size of the dictionary. Embodiments of the invention depart from this approach and design APAKE protocols based on alternative primitives.

Password Dictionary

Let $\mathcal{D} \subseteq \{0,1\}^*$ be a public password dictionary, which is assumed to be efficiently recognizable and of constant or polynomial size. For the sake of simplicity, assume that all passwords are chosen uniformly at random from $\mathcal{D}$, and are represented by bitstrings of the same length (denoted by $\mu$). The results provided under such assumptions can be easily adapted to an arbitrary distribution $\gamma$ on the password dictionary $\mathcal{D}$.

Participants

Protocol participants are of two distinguished types: clients, holding each a unique password from $\mathcal{D}$, and servers, holding each a finite password set contained in $\mathcal{D}$. We denote by $\mathcal{C}$ the set of clients and by $\mathcal{S}$ the set of servers, assuming both of them to be of finite and public size $k_c$ and $k_s$, respectively. Thus, the global set of protocol participants is the union of these two sets denoted by $\mathcal{U}$, i.e., $$C := \{C_{i_1}, \ldots, C_{i_{k_c}}\}, S := \{S_{j_1}, \ldots, S_{j_{k_s}}\}$$

and $\mathcal{U} := \mathcal{C} \cup \mathcal{S}$.

Assume the indices $i_1, \ldots, i_{k_c}, j_1, \ldots, j_{k_s}$ are $k_s + k_c$ different natural numbers. Thus, party $U_t$ can be referred to without specifying whether it is a client or a server, as t will either belong to $i_1, \ldots, i_{k_c}$ (if $U_t$ is a client) or to $j_1, \ldots, j_{k_s}$ (if $U_t$ is a server). A client C or a server S (without subscript) can also simply be referred to in case there is no ambiguity. In order to ease exposition, it can be assumed that each party is either a client or a server, i.e., $\mathcal{C} \cap \mathcal{S} = \emptyset$.

Protocol Outline

An APAKE protocol $\mathcal{P}$ is executed by a client C holding password $p \in \mathcal{D}$ and a server S that, in turn, holds a password set $D_S \subseteq \mathcal{D}$. Note that all APAKE protocols to date have included (even if not explicitly pinpointed) an offline phase for the server. During such offline phase, the server runs a procedure that, on input a security parameter 1, outputs a high-entropy master key K and a set of parameters params. The parameters params are shared with the client. During the online phase, the server's private input are K and $D_S$, while the client's private input is p. The two parties exchange their high-entropy contributions to the key and, provided that $p \in D_S$, they individually derive the same session key and corresponding session and partner identifiers.

Security Model

The following paragraphs provide a security model helpful for understanding the APAKE protocols according to embodiments of the invention. The security model uses as a starting point the security model for PAKE introduced by Bellare et al. (Mihir Bellare, David Pointcheval, and Phillip Rogaway. Authenticated Key Exchange Secure Against Dictionary Attacks. In Bart Preneel, editor, *Advances in Cryptology—EUROCRYPT* 2000, volume 1807 *of Lecture Notes in Computer Science*, pages 139-155. Springer, 2000). However, APAKE calls for a security model that is in many ways more involved than the security model for PAKE. Partially, this is because in APAKE, the party acting as a server may use several passwords in each execution. Also, models for PAKE focus on key secrecy and do not consider anonymity (in terms of passwords held by the parties) since there is one valid password shared among all honest parties. Differently, in APAKE there are several clients with different passwords and several servers with different passwords sets. An execution between two parties may or may not yield a common key, and furthermore, the outcome of the execution may erode the anonymity of the participants. For example, a server, with password database $D_S$, may engage in a protocol execution with a client and learn whether the client holds one of the passwords in $D_S$.

Previous APAKE proposals introduce rather informal security models that lack to capture sufficient security and privacy guarantees for the involved parties. For example, previous models do not provide a definition of server anonymity, thereby overlooking information that a protocol execution may leak about the password database at the server. Further, it is often assumed the existence of only one server that holds all valid passwords. This design choice turns out to have an effect on client anonymity since an adversary, playing as a server, cannot use different password databases to identify the password held by a victim client. Also, no previous APAKE model allows the adversary to corrupt honest parties. Corruption of honest parties is usually introduced in AKE protocols to model forward secrecy. Yet, corruptions also affects client and server anonymity in APAKE (see Definition 5 and Definition 6 below).

Given the lack of formalism of previous work and its shortcomings, the following introduces a new security model for APAKE that takes into account key secrecy as well as anonymity for both clients and servers.

Communication Model and Adversarial Capabilities

Parties are modeled as probabilistic polynomial-time (ppt) Turing machines. Each party $U_i \in \mathcal{U}$ may execute a polynomial number of protocol instances in parallel. To refer to instance $l_i$ of party $U_i \in \mathcal{U}$ the notation $U_i^{l_i}$ is used or write $C_i^{l_i}$ (resp., $S_i^{l_i}$) is used to make explicit that the party is a client (resp., a server). Clients and servers are assumed to be honest-but-curious; this is thus reflected in our definitions of anonymity where the adversary is not allowed to use the Send oracle. On the other hand, adversaries aiming at violating key secrecy are assumed to be malicious.

Communication Network

Arbitrary point-to-point connections are assumed among the parties in $\mathcal{U}$. The network is non-private and fully asynchronous. In particular, the network is controlled by the adversary, who may delay, insert and delete messages at will.

Protocol Instances

A single instance $U_i^{l_i}$ is essentially a process executed by $U_i$. We assign to each instance the following variables:
a) $used_i^{l_i}$ indicates whether this instance is or has been used for a protocol run;
b) $state_i^{l_i}$ keeps the state information needed during the protocol execution;
c) $term_i^{l_i}$ indicates whether the execution has terminated or not;
d) $sid_i^{l_i}$ denotes a possibly public session identifier that can serve as an identifier of the session key agreed through this execution;
e) $pid_i^{l_i}$ stores unique ephemeral labels chosen by the two entities aiming at establishing a joint key through this execution.
f) $test_i^{l_i}$ indicates whether this instance has been tested by the adversary (see below). It is initially set to false;
g) $acc_i^{l_i}$ indicates if the protocol instance was successful, i.e., if the party has accepted the session key;
h) $sk_i^{l_i}$ stores the session key once it is accepted by $U_i^{l_i}$. Before acceptance, it stores a distinguished NULL value.

Adversarial Capabilities

As it is customary in security models for key establishment, the adversarial capabilities are formalized via oracle queries. An adversary $\mathcal{A}$ (seen as a ppt Turing machine) is allowed to query the following oracles concurrently and in any order:
a) $Send(U_i^{l_i}, M)$. This oracle models active adversaries. It sends message M to instance $U_i^{l_i}$ and returns the reply generated by that instance. If $\mathcal{A}$ queries this oracle with an unused instance $U_i^{l_i}$ and M being the string "Start", then the $used_i^{l_i}$-flag is set, and the initial protocol message of $U_i^{l_i}$ is returned.
b) $Execute(U_i^{l_i}, U_j^{l_j})$. This oracle executes a complete protocol run among the specified unused instances. The adversary obtains a transcript of all messages sent over the network. A query to the Execute oracle thus models passive eavesdropping on a protocol execution involving the invoked parties. Without loss of generality, we assume that an Execute query specifies a client instance as the first input and a server instance as the second one.
c) $Reveal(U_i^{l_i})$. This oracle returns the session key $sk_i^{l_i}$ along with the session identifier $sid_i^{l_i}$. If the session key has not been defined for the instance specified in input, this oracle outputs an error symbol $\bot$.
d) $Test(U_i^{l_i})$. This oracle is used to model key secrecy. At the beginning of the security game it selects a bit b uniformly at random. If either no session key has been defined at this point for instance $U_i^{l_i}$, or this instance is not fresh (see Definition 3), then the oracle returns an error symbol $\bot$. Otherwise, if the oracle has not been called with input $U_i^{l_i}$, it outputs the real session key if b=0 or a key selected uniformly at random if b=1. Further, the oracle stores the output to provide consistent answers in case it is queried again on $U_i^{l_i}$ or on a partnered instance (see Definition 2). Finally, the flag $test(U_i^{l_i})$ is set to true.
e) $Corrupt(U_i)$. This oracle returns the password or password set held by $U_i$. Typically, Corrupt oracles in AKE are used to model different flavours of so-called forward secrecy, capturing the fact that leaking long-term keys should not affect the secrecy of previously agreed session keys. Such a property is not included in this model (yet—it is noted later that our key privacy definition includes such guarantees). As it will be clear later in the model the Corrupt oracle becomes relevant for the formalization of anonymity notions.
f) $Reveal^+(S_j^{l_j})$. This oracle is used to model the honest-but-curious behaviour of servers. Queried on an instance $l_i$ of a server $S_j$, it returns the master secret key K that is typically generated by the server during the offline phase. If this has not been defined, it outputs an error symbol $\bot$.

The following provides a definition of correctness. Definition 1 (Correctness): Let $\mathcal{D}$ be a dictionary, we say an APAKE protocol $\mathcal{P}$ is correct if, in presence of a passive adversary $\mathcal{A}$—i.e., $\mathcal{A}$ cannot use the Send oracle an execution of the protocol between instance $C_i^l$ of client $C_i$ with password p and instance $S_j^t$ of server S with password set $D_S \subseteq \mathcal{D}$, such that $p \in D_S$, ensures the following with overwhelming probability: (i) both client and server accept, i.e., $acc_i^l = acc_j^t = true$ (ii) they compute the same session identifiers, i.e., $sid_i^l = sid_j^t$, (iii) their partner identifiers are consistent, i.e., $pid_i^l = pid_j^t$, (iv) their session keys are defined and match $sk_i^l = sk_j^t \neq NULL$. On the other hand, if $p \notin D_S$, then $acc_i^l = acc_j^t = false$ with overwhelming probability.

Key Secrecy

Modeling key secrecy in (A)PAKE protocols requires ruling out trivial attacks (e.g., those where the adversary trivially learns the established key by revealing an instance involved in the attacked execution). The following definitions of freshness and partnering helps rule out such attacks.

Definition 2 (Partnering). Two instances $C_i^{l_i}$ and $S_j^{t_j}$ are partnered if and only if the following conditions are fulfilled: (i) Both $\text{acc}_i^{l_i}$ and $\text{acc}_j^{t_j}$ are set to true; (ii) Their session identifiers are defined and coincide, i.e., $\text{sid}_i^{l_i} = \text{sid}_j^{t_j}$; (iii) Their partner identifiers are consistent, that is, $\text{pid}_i^{l_i} = \text{pid}_j^{t_j}$; (iv) No other instance $U_m^p$ has accepted with partner $S_j^{t_j}$ or $C_i^{l_i}$. Additionally, we will assume that any instance is partnered with itself.

Definition 3 (Freshness). An instance $U_i^l$ is called fresh if $\text{acc}_i^l = \text{true}$ and the adversary has not: queried $\text{Reveal}(U_i^l)$ nor $\text{Reveal}(U_j^t)$ with $U_i^l$ and $U_j^t$ being partnered; queried Corrupt($U_j$) and subsequently $\text{Send}(U_i^t, *)$ where $U_i^l$ is partnered with $U_j^t$, for some t.

Indeed, revealing a session key from an instance $U_j^t$ trivially yields the session key of the instance partnered with it (if any), and hence this kind of trivial attack must be excluded in the security definition. Further, malicious insiders are not considered. Thus, if an adversary corrupts a client, then he should not be allowed to send messages on behalf of that client in the attacked session. This way Corrupt calls here capture the influence of leaked passwords on previously agreed keys, and thus the model includes a kind of forward secrecy.

A canonical goal of external adversaries attacking key establishment protocols is to gain information on the key being established, which in particular would allow an adversary to distinguish the actual key from a value selected uniformly at random from the key space. To capture this in a formal definition, Succ(l) denotes the probability that the adversary, making Test queries to fresh instances only, guesses correctly the bit b of the Test oracle. In turn, the APAKE-advantage of $\mathcal{A}$ in breaking the semantic security of our scheme is denoted by $\text{Adv}_\mathcal{A}(l)$ and defined as: $\text{Adv}_\mathcal{A}(l) = |2 \cdot \text{Succ}(l) - 1|$.

Definition 4 (Key Secrecy). An APAKE protocol $\mathcal{P}$ defined as above provides key secrecy, if for every dictionary $\mathcal{D}$ and every ppt adversary $\mathcal{A}$ who has access to Execute, Send, Test, Corrupt and Reveal oracles and queries the Send-oracle with at most q different instances, the following inequality holds for some negligible function negl(l): $\text{Adv}_\mathcal{A}(l) \leq \varepsilon(l, q) + \text{negl}(l)$, where l is the security parameter and $\varepsilon$ is a function which is at most linear in q (typically a constant multiple of $$\frac{q}{|\mathcal{D}|}$$

plus some negligible factor). Further, by the definition of $\text{Adv}_\mathcal{A}$, Test queries are allowed only to fresh instances.

Anonymity

As noted above, security models for standard PAKE do not account for anonymity. Actually, all players are publicly identifiable (with identifiers explicitly used in the protocol) and all honest parties share the only password. Regarding APAKE, previous models only consider client anonymity against the one server which holds all valid passwords. As a consequence, previous model (1) do not account for leakage of information on the password database, and (2) do not allow the adversary (playing as a server) to use different password databases when trying to identify the password held by the victim client.

The security model described herein considers a more realistic scenario and uses several servers to model the ability of the adversary to leverage different password databases. As a consequence, two parties engaged in an execution may or may not share a password. Clearly, anonymity in these settings require that an external adversary should not be able to tell whether an execution between two parties yields a common key. That is, the protocol should ensure that Execute calls do not reveal whether the involved parties have accepted or not. However, an adversary may still learn whether two parties share a password by calling Execute on unused instances of those two parties, and then calling Reveal on any of the involved instances. Alternatively, the adversary may learn whether two parties share a password by a combination of Execute and Reveal$^+$ calls. Further, the adversary may learn which is the password they share by calling Corrupt on the client, or reduce significantly the password entropy by corrupting the server. For this reason, the definition of anonymity limits the use of the Reveal, Reveal$^+$ and Corrupt oracles. For example, if the adversary must tell which of two challenge passwords is held by a client, the adversary should not be allowed to Reveal server instances that hold exactly one of those passwords and have executed the protocol with an instance of the victim client. In order to capture the restrictions imposed to the adversary in our anonymity formalization below, what is meant by distinguishing clients and servers is clarified.

Distinguishing Clients and Servers

In the following game-based definitions the adversary picks either two challenge passwords $p_0$, $p_1$ (when modeling client anonymity) or two challenge passwords sets $D_0$, $D_1$ (when modeling server anonymity). In case the adversary chooses two passwords $p_0$, $p_1$, a server $S \in \mathcal{S}$ with password database $D_S$ is distinguishing if $|D_S \cap \{p_0, p_1\}| = 1$, i.e., if the password database of S holds exactly one of the two passwords chosen by the adversary. In case the adversary picks two passwords sets $D_0$, $D_1$, a client $C \in \mathcal{C}$ with password p is distinguishing if $p \in D_0 \Delta D_1$, where $\Delta$ denotes the symmetric difference between the two sets.

Client Anonymity

Client anonymity can be modeled with a kind of indistinguishability game between the adversary $\mathcal{A}$ and a challenger Ch. The adversary chooses two passwords, say $p_0$, $p_1$, and sends them to the challenger. The latter randomly selects one, say $p_b$, and acts as a legitimate client $C_{Ch}$ holding the selected password. Next, the adversary interacts with the protocol participants via Execute, Reveal, Reveal$^+$ and Corrupt queries. Reveal and Reveal$^+$ queries model an honest-but-curious server by allowing the adversary to learn the master secret key and the password database of a given server instance. Since the focus is on a passive adversary, Send queries are not allowed. However, $\mathcal{A}$ cannot Reveal instances of a distinguishing server $S_i$ that have run the protocol with instances of $C_{Ch}$. Similarly, he cannot call Reveal$^+$ on a distinguishing server and then execute it with the challenger as client. Further, the adversary can neither Reveal nor Corrupt the challenger $C_{Ch}$. Finally, $\mathcal{A}$ wins if it can tell which of the two passwords has actually been chosen by the challenger.

The game between adversary $\mathcal{A}$ equipped with Execute, Reveal, Reveal⁺ and Corrupt oracles and challenger Ch unfolds as follows:

1. $\mathcal{A}$ interacts with participants in $\mathcal{U}$ at will via oracle queries;
2. $\mathcal{A}$ selects two different passwords $p_0$, $p_1$ from $\mathcal{D}$ and hands them to the challenger;
3. Ch chooses a bit b∈{0,1} uniformly at random and acts as client $C_{Ch}$ using password $p_b$ and following the specification of the protocol $\mathcal{P}$;
4. A interacts with all participants in $\mathcal{U} \cup \{C_{Ch}\}$, outputs b', and wins if b'=b provided that:
    $\mathcal{A}$ never called Corrupt($C_{Ch}$);
    $\mathcal{A}$ never called Reveal($C_{Ch}^l$) or Reveal($S_j^t$) after Execute($C_{Ch}^l, S_j^t$) for some l, t where $S_j$ is a distinguishing server;
    $\mathcal{A}$ never called Reveal⁺($S_j^t$) and Execute($C_{Ch}^l, S_j^t$) for some l, t where $S_j$ is a distinguishing server.

Note that the definition accounts for an adversary that identifies distinguishing servers via Corrupt queries (these may, for instance, be identified in the first step of the game) and later use the Execute oracle to obtain transcripts of executions involving those servers and the challenger.

Definition 5 (Client Anonymity). We say that an APAKE protocol $\mathcal{P}$ achieves client anonymity if every ppt $\mathcal{A}$ wins the above game with (at most) negligible probability over a random guess. More precisely, for every ppt adversary $\mathcal{A}$, let Succ(l) be the probability that $\mathcal{A}$ guesses correctly the bit b selected by Ch: Now we define $\mathcal{A}$'s advantage as the function $\mathrm{Adv}_{\mathcal{A}}^{\mathrm{CAnon}}(l) := |2 \cdot \mathrm{Succ}(l) - 1|$. Then $\mathcal{P}$ has client anonymity if $\mathrm{Adv}_{\mathcal{A}}^{\mathrm{CAnon}}(l) \leq \mathrm{negl}(l)$ for some negligible function negl.

Previous definitions of client anonymity use a game similar to that described herein, where passwords are assigned to clients according to a distribution γ, and the adversary picks clients instead of passwords. The adversary, therefore, tries to guess which client was chosen by the challenger. Such a game can be written in the same fashion as our game above, by constraining the adversary to choose $p_0$, $p_1$ according to the prescribed distribution γ. It is easy to see that our definition of client anonymity is stronger than the one used in previous work.

Server Anonymity

Server anonymity captures the leakage on the password database via protocol executions. Previous work does not consider server anonymity and assumes a single server that holds all valid passwords. It can be argued that even in the single server scenario, the password database may change over time and a definition of server anonymity is key to quantify the leakage of information on the password database.

Server anonymity can be modelled with the following game where the adversary chooses two distinct password sets of the same size, say $D_0$, $D_1$, and hands them to the challenger. Then, the challenger acts as a legitimate server $S_{Ch}$ holding one of the two sets (selected uniformly at random). The adversary can interact with any of the protocol participants via Execute, Reveal and Corrupt queries. However, the adversary cannot Reveal instances of a distinguishing client $C_i$ that have run the protocol with instances of $S_{Ch}$. Obviously, the adversary cannot Reveal nor the adversary can Corrupt $S_{Ch}$. Finally, $\mathcal{A}$ wins if it can tell which of the two password sets has actually been chosen by the challenger.

The game between adversary $\mathcal{A}$ equipped with Execute, Reveal and Corrupt oracles and challenger Ch unfolds as follows:

1. $\mathcal{A}$ interacts with participants in $\mathcal{U}$ via oracle queries
2. $\mathcal{A}$ selects two distinct password sets $D_0$ and $D_1$ from D, such that $|D_0|=|D_1|$, and hands them to the challenger
3. Ch chooses a bit b∈{0,1} uniformly at random and acts as server $S_{Ch}$ using password set $D_b$ and following the specification of $\mathcal{P}$
4. $\mathcal{A}$ interacts with all participants in $\mathrm{U} \cup \{S_{Ch}\}$, outputs b', and wins if b'=b provided that:
    $\mathcal{A}$ never called Corrupt($S_{Ch}$)
    $\mathcal{A}$ never called Reveal($S_{Ch}^l$) or Reveal($C_j^t$) after Execute($C_j^t, S_{Ch}^l$) for some l, t where $C_j$ is a distinguishing client.

Definition 6 (Server Anonymity). A correct APAKE protocol $\mathcal{P}$ achieves server anonymity if every ppt $\mathcal{A}$ wins the above game with (at most) negligible probability over a random guess. More precisely, for every ppt adversary, let Succ(l) be the probability that an adversary $\mathcal{A}$ guesses correctly the bit b selected by Ch. Now $\mathcal{A}$'s advantage can be defined as the function: $\mathrm{Adv}_{\mathcal{A}}^{\mathrm{SAnon}}(l) := |2 \cdot \mathrm{Succ}(l) - 1|$. Then $\mathcal{P}$ has client anonymity if $\mathrm{Adv}_{\mathcal{A}}^{\mathrm{SAnon}}(l) \leq \mathrm{negl}(l)$ for some negligible function negl.

Another relevant notion in protocols where participants are anonymous is the one of unlinkability. In this setting, one may wish that protocol transcripts cannot be linked to a party—neither by an honest-but-curious participant, nor by an eavesdropper. Nevertheless, unlinkability is not elaborated upon since it has been shown that unlinkability is (in some sense) equivalent to the notion of anonymity in key exchange protocols.

One may wonder whether the above indistinguishability-like notions of client and server-anonymity provide some semantic security guarantees with respect to the password(s). Password privacy has not been considered in prior APAKE constructions, yet arises as a natural goal in many PAKE scenarios. In Appendix C we give a formal definition of password-privacy for APAKE and show that it is implied by our anonymity definitions.

Tools

Authenticated Encryption

Let AEnc=(KeyGen, Enc, Dec) be a symmetric-key encryption scheme. AEnc is said to be authenticated if it attains some authenticity guarantees, in addition to confidentiality. Bellare et al. (Mihir Bellare and Chanathip Namprempre. Authenticated encryption: Relations among notions and analysis of the generic composition paradigm. *J. Cryptology*, 21(4):469-491, 2008) prove that cipher text indistinguishability (IND-CTXT) together with indistinguishability under chosen plaintext attacks (IND-CPA) grant the strongest privacy properties for symmetric encryption. Namely, IND-CA and NM-CA.

Typically, authenticated encryption is obtained by implementing a certain block cipher using a special mode of operation that integrates a message authentication code (MAC). For instance, OCB, as described by Krovetz et al. (Ted Krovetz and Phillip Rogaway. The OCB authenticated-encryption algorithm. *RFC*, 7253:1-19, 2014. Ted Krovetz and Phillip Rogaway. The OCB authenticated-encryption algorithm. *RFC*, 7253:1-19, 2014), encrypts a plaintext that is bound to a certain string, called the associated data, which is authenticated with a MAC but not encrypted. In this way, the decryption algorithm Dec takes a key, a ciphertext, (and possibly a nonce or init vector), and returns either a plaintext or a special symbol, INVALID. Authenticity provides that on input any adversarially-created ciphertext, the decryption algorithm will almost certainly output the INVALID tag.

OPRF

We make use of so-called Oblivious Pseudo-Random Functions (OPRFs) as defined by Freedman et al. (Michael J. Freedman, Yuval Ishai, Benny Pinkas, and Omer Reingold. Keyword search and oblivious pseudorandom functions. In Joe Kilian, editor, *Theory of Cryptography, Second Theory of Cryptography Conference, TCC* 2005, *Cambridge, Mass., USA, Feb.* 10-12, 2005, *Proceedings*, volume 3378 of *Lecture Notes in Computer Science*, pages 303-324. Springer, 2005). An OPRF is a two-party protocol $\pi$ realizing the functionality $g(r,w)=(\bot, f_r(w))$ where $\{f_r\}_{r \in p}$ is a pseudo-random function family indexed by a countable set p and $\bot$ denotes the empty output. Thus, $\pi$ can be made explicit through two phases:

a) Setup. Outputs definitional parameters $params_\pi$ for the family $\{f_r\}_{r \in p}$;

b) Run. This is an interactive protocol taking as the client's private input a point w and as the server's private input an index $r \in p$; it gives as private output to the client the evaluation $f_r(w)$ (while the server learns nothing).

IBE

We also leverage a blind anonymous identity based encryption scheme IBE as defined by Meiklejohn et al. (Sarah Meiklejohn, Keaton Mowery, Stephen Checkoway, and Hovav Shacham. The phantom tollbooth: Privacy-preserving electronic toll collection in the presence of driver collusion. In 20*th USENIX Security Symposium,* 2011). The latter consists of the following algorithms:

a) IBE. Setup: On input a security parameter l; outputs public parameters params and master secret key msk. The parameters params are taken as input by all of the following algorithms.

b) IBE.Extract: On input the master secret msk and an identity id; outputs a secret key $sk_{id}$ associated to id.

c) IBE.Enc: On input a message m and an identity id; outputs a ciphertext c encrypting m under id.

d) IBE.Dec: On input a ciphertext c and a secret key $sk_{id}$, outputs a message m.

e) IBE.BlindExtract: This is an interactive two-party protocol between a client with private input an identity id and a server with private input msk. At the end of the protocol, the client's private output is a secret key $sk_{id}$ while the server outputs nothing.

Informally, an identity based encryption scheme is anonymous if a ciphertext does not leak the identity under which it was constructed. The scheme is blind since the IBE.BlindExtract algorithms allows a client to obtain a secret key for an identity id, without the server learning that identity (see Meiklejohn et al. for precise definitions).

We require the identity-based encryption scheme to fulfil an extra property that we name Id-private. Typically, anonymity in this context implies that given a ciphertext c, an adversary should not be able to tell under which identity it was produced, out of two identities $id_0$, $id_1$ it has previously chosen. At this, the adversary may obtain all secret keys but the ones associated with $id_0$, $id_1$. However, here we require something different: given a ciphertext c encrypting a message unknown to the adversary, the latter should not be able to tell under which identity the ciphertext was produced, even if it has access to the master secret key (and therefore can compute secret keys for any identity).

Definition 7 (Id-private). Let IBE be an identity based encryption scheme. Consider a ppt adversary $\mathcal{A}$ interacting with a challenger Ch in the following game, Ch executes IBE.Setup and forwards to $\mathcal{A}$ the output; namely, the public parameters params and the master secret key msk; $\mathcal{A}$ forwards two identities of its choice, $id_0$ and $id_1$ to Ch; Ch selects a bit u. a. r., selects a message m u.a.r. from the plaintext space, computes $c=IBE.Enc(params,id_b,m)$, and sends c to A; and A outputs a guess b* for the bit b. Then IBE is Id-private, if b=b* with probability (at most) negligibly over ½.

It is straightforward to see that the scheme of Meiklejohn et al. is Id-private according to the definition above. Specifically, an encryption of a message m under identity id is a ciphertext of the form $c=(g^r, m \oplus h)$, where g is the generator of a cyclic group, r is a fresh exponent chosen u.a.r. and h is a hash value computed from id, r and some public parameters. Clearly, in the Id-privacy game, and from the view of $\mathcal{A}$, the probability distribution of c is perfectly indistinguishable from the uniform distribution on the ciphertext space.

The current invention logically divides APAKE in five phases as follows:

i. Setup: In this phase, the server sets up the APAKE execution, defines public parameters and sends them to the client. The server also derives a high-entropy master key.

ii. BlindExtraction: In this phase, the server and the client derive a common, high-entropy secret from the client's password and the server's master key. This protocol must ensure that the server does not learn the client's password, nor that the client learns the server's master key.

iii. ServerSend: In this phase, the server sends its nonce to the client. This phase must ensure that only the client with the secret obtained during BlindExtraction can recover the nonce.

iv. ClientSend: In this phase the client sends its nonce to the server. This phase must ensure that only the server that has sent his nonce during ServerSend can recover the nonce.

v. KeyDerivation: In this phase both client and server derive a common cryptographic key based on the nonces exchanged in the previous phase.

FIG. 1 depicts the steps of an authentication and key establishment protocol according to an embodiment of the invention.

Embodiments of the present invention provide for the following advantages: use of OPRF to enable APAKE without the requirement from the client to know the index of its password in the password database held by the server, use OPRF to securely transfer the server's contribution to the key being established to a client holding a valid password, and use of associative arrays and hash functions with input the output of the OPRF protocol to securely index a set of ciphertexts so that a client holding a valid decryption key can retrieve the ciphertext it can decrypt in constant time.

In the following we detail three APAKE systems that follow the general structure outlined above, by using different cryptographic primitives. The first instantiation is the most efficient one since it requires constant computation complexity at the client. The other instantiations are less efficient but rely on different cryptographic primitives.

1) OPRF-Based APAKE.

A Pseudo-Random Function (PRF) is an efficiently computable keyed function with outputs that, for a given key, are indistinguishable from random points in the range of the function. An Oblivious PRF or OPRF, as described, e.g., in Freedman et al., is an interactive protocol between a sender and a receiver to compute a PRF function f( ). In particular, the sender inputs a key r to the function and the receiver inputs a point x in the function domain. At the end of the protocol, the receiver learns f(r, x), while the server learns nothing. An OPRF guarantees that the sender learns nothing about the receiver's input while the receivers learns nothing but f(r, x). In the following we detail an APAKE system based on OPRF.

Let A be an associative array with operations A.insert(i, v) to store value v at index i, and A.query(i) to retrieve the value stored at index i; if no element was previously stored at index i, the query returns a special symbol $\bot$.

Let an OPRF be defined by a pair of algorithms (OPRF Setup, OPRFEvaluate) that unfold as follows:
- [pp, r]:=OPRFSetup( ) is a randomized algorithm that outputs public parameters pp including the description of the function f( ) and a random key r.
- [Receiver(f(r, x)); Sender( )]:=OPRFEvaluate(pp, Receiver(x), Sender(r)) is an interactive protocol between a receiver Receiver with private input x and a sender Sender with private input r. Public parameters pp are available to both parties. At the end of the protocol, the receiver learns f(r,x) while the sender learns nothing. The notation Sender( ) (resp. Receiver( ) is used to denote Sender's (resp. Receiver's) private inputs and outputs.

Let $\Pi$ be a symmetric encryption scheme defined by a triplet of algorithms (KeyGen, Enc, Dec) that unfold as follows:
- k:=KeyGen( )) is a randomized algorithm that outputs a key k.
- c:=Enc(k, m) is a randomized algorithm that on input a key k and a message m, outputs a ciphertext c.
- m:=Dec(k,c) is a deterministic algorithm that on input a key k and a ciphertext c, outputs a message m.

The encryption scheme is correct if m:=Dec(k, Enc(k, m)) for any k:=Keygen( ) and for any m belonging to the message space of the scheme. The encryption scheme is said (IND-CPA) secure if an adversary that does not have the encryption key k cannot distinguish which of two messages of his choice is encrypted under a ciphertext c produced by using key k.

Let H, H', G be cryptographic hash functions.

Setup:

The Server S sets up a new OPRF; the key r is kept secret. The Server also generates a secret key $k_S$ for the symmetric encryption scheme. The Server also selects a random nonce $N_S$ to be used as its contribution in the computation of the final key.
1. Server executes
   [pp, r]:=OPRFSetup( )
   $k_S$:=KeyGen( )
   Pick random nonce $N_S$
2. Server sends pp to Client Blind Extraction:

The Client and the Server engage in the OPRF protocol where the Client acts as the receiver with private input the Client's password p, and the Server acts as the sender with private input r. At the end of the protocol, the Client learns the "password-tag" t=f(r, p). The Server learns nothing.
3. Client and Server execute [C(t); S( )]:=OPRFEvaluate (pp, C(p), S(r)). Note that t=f(r, p).

Server Send:

For each password $p_i$ in the password database, the Server computes the corresponding password-tag $t_i$=f(r, $p_i$) and maps it to a key for the symmetric encryption scheme by means of a cryptographic hash function H( ). We call this key the password-key and denote it by $k_i$. The Server encrypts $N_S \| k_S$ with each password-key thereby generating n ciphertexts $c_1, \ldots, c_n$. Ciphertexts are stored in an associative array A where the index for value $c_i$ is computed as G(f(r, $p_i$)), where G is another cryptographic hash function. The Server sends A to the Client.
4. Server initializes an empty associative array A
5. Server executes
   For $1 \leq i \leq n$:
   $k_i$:=H(f(r, $p_i$))
   $ind_i$:=G(f(r, $p_i$))
   $c_i$:=Enc($k_i$, $N_S \| k_S$) Note that denotes string concatenation.
   A.insert($ind_i$, $c_i$)
6. Server sends A to Client Client Send:

The Client computes the password-key and index for its password as k:=H(t), ind:=G(t), respectively. Next, the Client queries A at index ind. If A(ind) returns ciphertext c, the Client tries to decrypt it with its password-key k. If p is equal to any password of the password database, by decrypting c the Client obtains $N_S$ and $k_S$. Next, the Client picks a random nonce $N_C$ to be used as its contribution in the computation of the final key. The Client uses a symmetric encryption scheme to encrypt $N_C$ under key $k_S$ and sends the ciphertext to the Server. The Server uses $k_S$ to decrypt the ciphertext received from the Client and recover $N_C$.
7. Client executes

--- k := H(t)
ind := G(y)
c := A.query(ind)
If c ≠ $\bot$
    m := Dec(k, c)
    Parse m as Ns ∥ ks
    Pick random Nc
    c':=Enc(sk, Nc)
Else
    Abort

---

8. Client sends c' to Server
9. Server executes
   $N_C$:=Dec(ks, c')

Keyderivation:

Both the Client and the Server derive a common cryptographic key.
10. Client executes
    Set shared key as K:=H'(S∥C∥NC∥NS)
11. Server executes
    Set shared key as K:=H'(S∥C∥NC∥NS)

OPRF-based APAKE according to embodiments of the invention can be alternatively described as follows. Our main tool for this construction is an oblivious pseudo-random function, it, as presented Freedman et al. In addition, we will also use an authenticated symmetric encryption scheme, such as described by Krovetz et al. (Ted Krovetz and Phillip Rogaway. The OCB authenticated-encryption algorithm. *RFC*, 7253:1-19, 2014). The authenticated symmetric encryption scheme AEnc=(KeyGen, Enc, Dec), which takes plaintexts on $\{0,1\}^{m(l)}$ and produces ciphertexts in $\{0,1\}^{t(l)}$, for some polynomials t and m.

Further, we will use four cryptographic hash functions G, H and G', H', that are assumed to behave as random oracles. If H ranges on $\{0,1\}^{h(l)}$ with h a certain polynomial, we would have t(l)=m(l)+h(l). As the sizes of domains and ranges of G, G' y H' are not needed for the theoretical description, we will not make them explicit—but assume them to be polynomial in l. In what follows and for the sake of readability, we will omit the instance superscript in the participant's variables (for example, we will write $sid_S$ to refer to the session identifier of the server on the considered instance).

Figure 2:
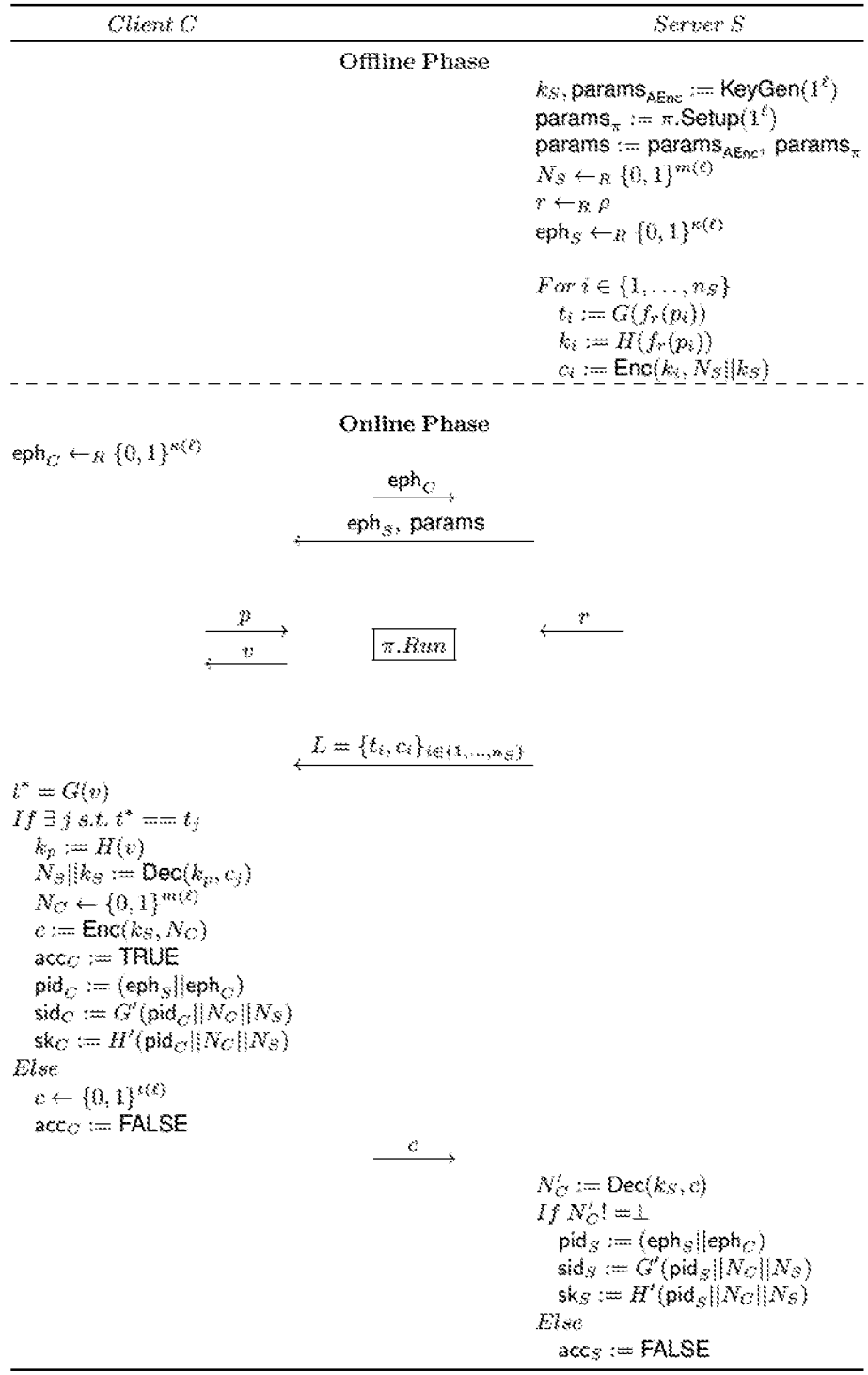
FIG. 2 illustrates an OPRF-based APAKE protocol according to an embodiment of the invention.

FIG. 2 illustrates an OPRF-based APAKE protocol according to an embodiment of the invention. The design illustrated in FIG. 2 allows the server to pre-compute most of the data needed to run the protocol. Thus, we describe the protocol by splitting it in an offline phase for the server and an interactive online phase between server and client.

The online phase starts with the client sending its ephemeral identity $eph_C$, while the server sends its ephemeral identity $eph_S$ and the parameters for $\pi$ and AEnc. Client and server jointly execute the OPRF protocol (i.e., $\pi$.Run) where the client acts as a receiver with private input p and the server acts as a sender with private input r; the private output for the client is $v = f_r(p)$. Next, the server sends a (shuffled) list $L = \{(t_i, c_i)\}_{p_i \in D_S}$ to the client. Now, the client compute $t^* = G(v)$, if the client's password p is in the server's password set, then $t^*$ matches a tag $t_j$ in L. Thus the client can decrypt the corresponding ciphertext $c_j$ with secret key $k_p = H(v)$ and, recover both $N_S$ and $k_S$. Finally the client chooses a random nonce $N_C$ as its contribution to the common key and sends it to the server, encrypted under $k_S$. The server recovers the nonce, and both parties derive the common key as a function of the nonces and their ephemeral identities. Session identifiers are subsequently derived using a different random oracle with the same inputs, thus guaranteeing consistency.

Note that a protocol transcript should not reveal to eavesdroppers whether the execution is successful or not (in order not to leak whether the client's password is in the server's password set). That is why in case $p \notin D_S$ and, therefore, $t^*$ has no matching tag in L, the client sends a random value in the ciphertext space of AEnc to the server; since AEnc is an authenticated encryption scheme, decryption at the server will output an error. Further, note that client and server choose random ephemeral identities ($eph_C$, and $eph_S$) of polynomial length $\kappa(l)$ at the beginning of the interaction, in order to derive (fresh) partner identifiers for each session.

It is easy to see that correctness is trivially achieved with overwhelming probability (otherwise either for different passwords p and $p^*$ it must be $f_r(p) = f_r(p^*)$, or there should be "consistent" collisions of the random oracles H and G).

The APAKE protocol depicted in FIG. 2 achieves key secrecy in the sense of Definition 4 in the random oracle model, assuming the underlying authenticated encryption scheme AEnc to be semantically secure, as defined in Bellare et al. (Mihir Bellare and Chanathip Namprempre. Authenticated encryption: Relations among notions and analysis of the generic composition paradigm. *J. Cryptology*, 21(4):469-491, 2008) and the protocol $\pi$ realizes an oblivious pseudo-random function as detailed in Freedman et al.

2) Opprf-Based Apake.

The main tool behind this APAKE system is an Oblivious Programmable Pseudo Random Function (OPPRF) as defined in Kolesnikov et al. (Vladimir Kolesnikov, Naor Matania, Benny Pinkas, Mike Rosulek, Ni Trieu. Practical Multi-party Private Set Intersection from Symmetric-Key techniques. In Symmetric-Key Techniques. CCS 2017). This is an extension to a standard OPRF. Recall that in an OPRF, the sender and the receiver engage in an interactive protocol where the receiver learns $y = f(r, x)$ where r is a private input of the sender and x is a private input of the receiver. In an OPPRF, the sender can fix a priori a number of points $(x_1, y_1), \ldots, (x_n, y_n)$, such that $y_i = f(r, x_i)$ while all outputs are indistinguishable from random points in the range of the function. Thus, the receiver learns $y = f(r, x)$ just like in a standard OPRF but the receiver does not learn whether its input was one on which the function was initially programmed by the sender. Any of the OPPRF schemes introduced in Kolesnikov et al. can be used for the proposed APAKE.

Let an OPPRF be defined by a pair of algorithms (OPPRFSetup, OPPRFEvaluate) that unfold as follows:

[pp,r]:=OPPRFSetup((x1,y1), . . . , (xn,yn)) is a randomized algorithm that outputs public parameters pp including the description of the function f( )) and a random key r.

[Receiver(f(r,x)); Sender( )]:=OPPRFEvaluate(pp, Receiver(x), Sender(r)) is an interactive protocol between a receiver Receiver with private input x and a sender Sender with private input r. At the end of the protocol, the receiver learns f(r,x) while the sender learns nothing. The notation Sender( )(resp. Receiver( )) is used to denote Sender's (resp. Receiver's) private inputs and outputs. The programmed inputs satisfy $f(r, x_i) = y_i$.

Let $\Pi$ be a symmetric encryption scheme as defined above.

Let H' be a cryptographic hash function as defined above.
Setup:
The Server S sets up a new OPPRF programmed to output $N_S \| k_S$ on input any password in P; the key r is kept secret. The Server also generates a secret key $k_S$ for the symmetric encryption scheme. The Server also selects a random nonce $N_S$ to be used as its contribution in the computation of the final key.
  1. Server executes
     [pp, r]:=OPPRFSetup(($p_1$, $N_S \| k_S$), . . . , ($p_n$, $N_S \| k_S$))
     $k_S$:=KeyGen( )
     Pick random nonce $N_S$
  2. Server sends pp to Client Blind Extraction and Server Send:
These two phases are jointly considered in this APAKE. Client and Server engage in an execution of OPPRFEvaluate allowing Client to learn t=f(r,p) which equals to $N_S \| sk$ if password p is in the password database P.
  1. Client and Server execute [C(t), S( )]:=OPPRFEvaluate (pp, C(p), S(r)).
     Note that $t = N_S \| k_S$ if p is in P
  2. Client parses y as $N_S \| k_S$ Client Send:
Client picks a random nonce $N_C$ to be used as its contribution in the computation of the final key. The Client uses a symmetric encryption scheme to encrypt $N_C$ under key $k_S$ obtained in previous phase and sends the ciphertext to the Server. The Server uses $k_S$ to decrypt the ciphertext received from the Client and recover $N_C$.
  3. Client executes
     Pick random $N_C$
     c:=Enc($k_{S_S}$, $N_C$)
  4. Client sends c to Server
  5. Server executes
     $N_C$:=Dec($k_S$, c)

Key Derivation:
This phase is identical to the same phase in the OPRF-based APAKE.

3) SPHF-Based APAKE
Smooth Projective Hash Functions (SPHF) are a central tool in many cryptographic constructions. Informally, they allow for a family of hash functions defined over a set X to be evaluated on inputs from a subset L in two different ways. On input an index k∈K and a value x∈X, a hash H(k, x) is computed via a standard hashing algorithm, while there is a special procedure which allows for the same evaluation if k is not known, as long as a certain projection s of it is provided, and a proof evidencing that x∈L. Moreover, hashes of values in XML, are indistinguishable from random values as long as k remains secret. We next present an APAKE based on SPHF as defined in Katz et al. (Jonathan Katz and Vinod Vaikuntanathan. Round-optimal Password-based Authenticated Key Exchange, Journal of Cryptology, Vol. 26, num. 4 2013).

Let an additively homomorphic public key encryption scheme be defined by a triplet of algorithms (PKKeyGen, PKEnc, PKDec) that unfold as follows:

[pk, sk]:=PKKeyGen( ) is a randomized algorithm that outputs a pair of keys pk, sk.

c:=Enc(pk, m) is a randomized algorithm that on input a public key pk and a message m, outputs a ciphertext c.

m:=Dec(sk, c) is a deterministic algorithm that on input a secret key sk and a ciphertext c, outputs a message m.

The encryption scheme is correct if m:=Dec(sk,Enc(pk, m)) for any [pk, sk]:=KeyGen( ) and any m belonging to the message space of the scheme. The encryption scheme is said (IND-CPA) secure if an adversary that does not have the secret key sk cannot distinguish which of two messages of his choice is encrypted under a ciphertext c produced by using the public key pk.

Our construction is based on the Paillier encryption scheme, as described by Paillier (Pascal Paillier. Public-key cryptosystems based on composite degree residuosity classes. EUROCRYPT 99), and our construction also builds on so-called smooth projective hash functions linked to labelled encryption schemes, following the construction of Katz et al.

Let a labelled public key encryption scheme be defined by a triplet of algorithms (LKeyGen, LEnc, LDec), that unfold as follows:

[lpp, lpk, lsk]:=LKeyGen( ) is a randomized algorithm that outputs public parameters lpp and a pair of keys lpk, lsk.

c:=LEnc(lpk, L, m, r) is a randomized algorithm that on input a public key lpk, a label L, a message m and randomness r (which for convenience is treated as a explicit input), outputs a ciphertext c.

m:=LDec(lsk, L, c) is a deterministic algorithm that on input a secret key lsk, a label L and a ciphertext c, outputs a message m.

The labeled encryption scheme is correct if m:=Dec(lsk, L,LEnc(lpk,L,m,r)) for any [pp, pk, sk]:=LKeyGen( ), label L, randomness r, and m belonging to the message space of the scheme.

Following the standard notion of security for public key encryption, a labelled encryption scheme is said (IND-CCA) secure if an adversary (with oracle access to a decryption oracle) that does not have the secret key lsk cannot distinguish which of two messages of his choice is encrypted under a ciphertext c produced by using the public key lpk.

For every execution of LKeyGen( ), once a public key lpk is fixed we can define a smooth projective hash function (SPHF). This is explicated as a tuple of algorithms (HashKG, ProjKG, Hash, ProjHash) such that:

k:=HashKG( ) is a randomized algorithm that outputs a key k.

a:=ProjKG(k) is a deterministic algorithm that on input a key k outputs a projection key a.

h:=Hash(k,(L,c,m)) is a deterministic algorithm that on input a key k and a value (L,c,m) outputs a hash value h.

h':=ProjHash(a,(L,c,m),r) is a deterministic algorithm that on input a projection key a, a value (L,c,m) and a value r (referred to as a "witness") outputs a hash value h'.

The SPHF is related to the labeled encryption scheme through the following correctness property: if k:=HashKG( ), a:=ProjKG(k), c:=Enc(lpk, L, m, r), h:=Hash (k,(L,c,m)) and h':=ProjHash(a,(L,c,m),r), then h=h'. Note that the correctness property binds the SPHF to a concrete public key lpk.

From the above specification, note that SPHF allows for two different ways of computing hashes for strings of the form (L,c,m):

Using the Hash algorithm, providing as input the hash index k and the point for evaluation (L,c,m)

Using the ProjHash algorithm, on input a projection key a, the input value (L,c,m) and an evidence (the witness r) that c is actually an encryption of (L,m) under the prescribed public key lpk.

Let H' be a cryptographic hash function as defined above. Setup:

The Server S sets up an additively homomorphic public key encryption scheme. The Server also generates a secret key k for the SPHF and computes the corresponding projection a. Further, the Server picks a random nonce $N_S$ to be used as its contribution in the computation of the final key. Both pk and a are sent to the Client.

1. Server executes k:=HashKG( ) and a:=ProjKG(k)

[pk, sk]:=KeyGen( )

Pick random nonce $N_S$

2. Server sends pk, a to Client

Blindextraction:

The Client computes a labeled encryption com of its password. From com, both Client and Server can compute hashes for their respective passwords. In order to do so, the Client uses the projection a and the randomness used in com, while the Server used the key k 1. Client executes

[lpp, lpk, lsk]:=LKeyGen( )

L:=S∥C∥a

Pick random r com:=LEnc(lpk,L,p,r)

2. Client sends lpp, lpk, com to Server

3. Server executes

L:=S∥C∥a

For $1 \leq i \leq n$, $x_i$:=Hash(k,(L,com,$p_i$))

Serversend:

The server constructs a polynomial Q such that the evaluation of Q on each $x_i$ equals $N_S$. Next the Server encrypts the coefficients of Q with the public key of the additively homomorphic encryption scheme and sends them to the Client. The Client uses the homomorphic properties of the scheme to construct an encryption of the evaluation of Q on its password p. The same can be done by Server, leading to both parties sharing a value PKEnc(pk, $N_S$), in case they share a password.

4. Server executes

Computes a polynomial Q(x) of degree n−1, such that $Q(x_i)=N_S$ for every $1 \leq i \leq n$.

Let $a_0, \ldots, a_{n-1}$ be the coefficient of the polynomial.
For $0 \leq i \leq n-1$,
  $c_i := \text{Enc}(pk, a_i)$
  $y := \text{Enc}(pk, Q(x_1))$ by using the homomorphic properties of Enc. Note that y is an encryption of $N_S$ 5. Server sends $\{c_i\}_{0 \leq i \leq n}$ to Client
6. Client executes
  $z := \text{ProjHash}(a, (L, com, p), r)$
  $y := \text{Enc}(pk, Q(z))$ by using the homomorphic properties of PKEnc.

Clientsend:

Client picks a random nonce $N_C$ to be used as its contribution in the computation of the final key. The Client uses the homomorphic encryption scheme to encrypt $N_C$ and sends the ciphertext to the Server. The Server uses sk to decrypt the ciphertext received from the Client and recover $N_C$.

7. Client executes
  Pick random $N_C$
  $c := \text{PKEnc}(pk, N_C)$
6. Client sends c to Server
7. Server executes
  $N_C := \text{Dec}(sk, c)$ Key Derivation:

This phase is identical to the same phase in the OPRF-based APAKE.

4) IBE-Based APAKE

The rationale behind our identity-based encryption (IBE)-based instantiation is that passwords in $\mathcal{D}$ can be used as client identities for an IBE scheme. We reserve a well-known identity ID for (all) servers. We thus assume that the identity space of the encryption scheme to be $\mathcal{D} \cup \{ID\}$. Let IBE denote the blind anonymous identity-based encryption scheme we are going to use, as described in Section 4. The plaintext space of IBE.Dec is $\{0,1\}^{m(l)}$, where l is the security parameter and m is a polynomial. We will also make use of three cryptographic hash functions H, G and G', assumed to behave as random oracles. The domain of H is $\{0,1\}^{m(l)}$. As the sizes of its range and of domains and ranges of G' and H' are not needed for the theoretical description, we will not make them explicit—but assume them to be polynomial in l.

Figure 3:
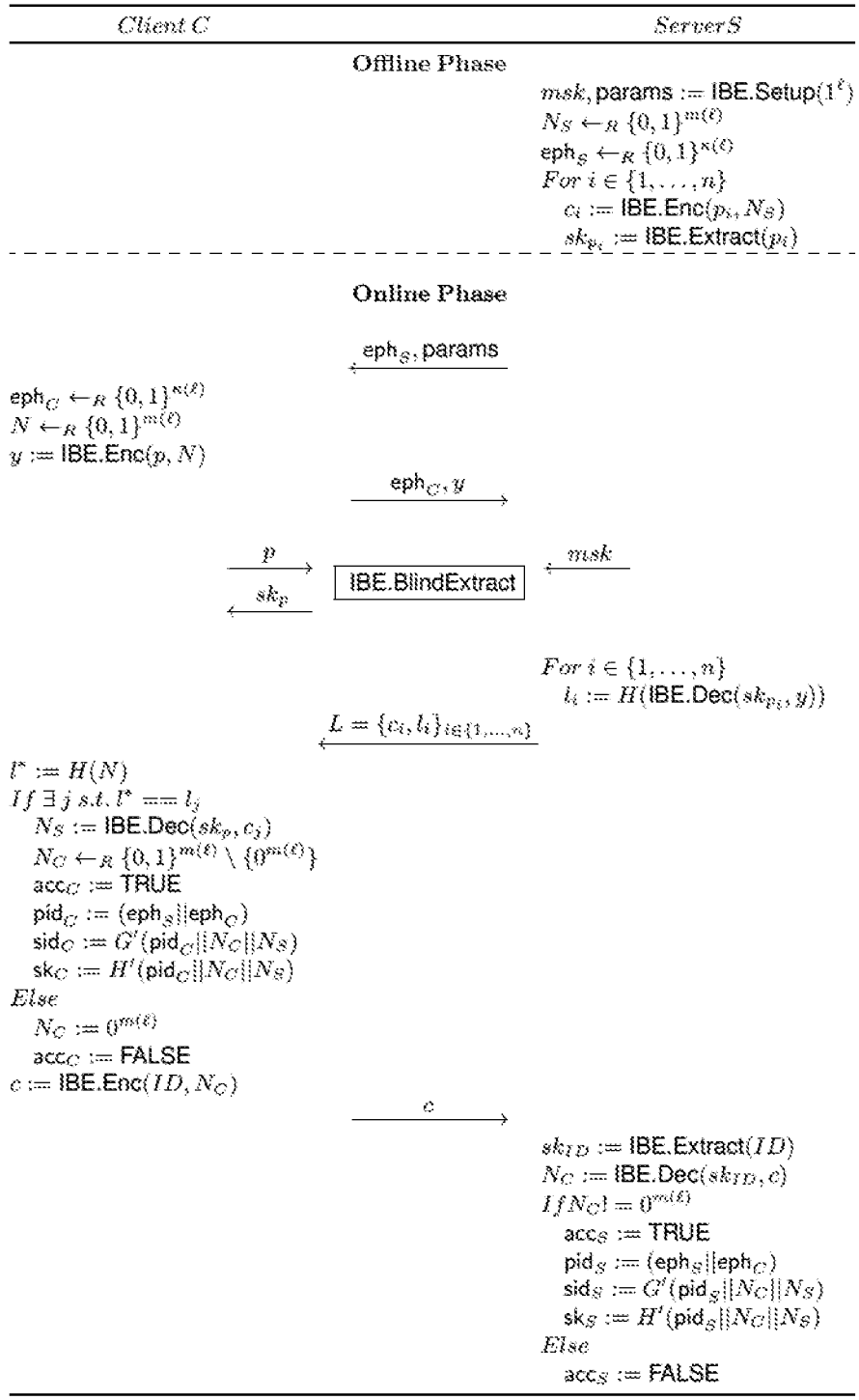
FIG. 3 illustrates an IBE-based APAKE protocol according to an embodiment of the invention.

FIG. 3 illustrates an IBE-based APAKE protocol according to an embodiment of the invention. During the offline phase, the server runs IBE.Setup to obtain a master secret key msk, and selects u.a.r. an ephemeral identifier $eph_S$ and a nonce $N_S$. Next, for each password $p_i \in D_S$, the server extracts (via IBE.Extract) the corresponding secret key $sk_{pi}$ (to be used in the online phase) and it also computes $c_i = \text{IBE.Enc}(p_i, N_S)$.

At the beginning of the online phase the server sends the IBE parameters params and its ephemeral identifier $eph_S$ to the client. The latter selects (u.a.r.) an ephemeral identifier $eph_C$ (both $eph_C$ and $eph_S$ are freshly generated nonces of polynomial length $\kappa(l)$ and are used to derive unique session identifiers; they are not to be confused with "identities" of the identity based encryption scheme) and a nonce N. The nonce is encrypted using as identity the client's password p as $y := \text{IBE.Enc}(p, N)$. Both y and $eph_C$ are sent to the server.

At this stage, client and server engage in an execution of IBE.BlindExtract. The client uses as private input its password p and obtains $sk_p$ as private output. The server uses as private input the master secret key and outputs nothing.

Next, the server matches each ciphertext $c_i$ with a label computed by decrypting y with the secret key associated to password $p_i$, and applying the random oracle to the resulting message. That is $c_i$ is associated to $l_i := H(\text{IBE.Dec}(sk_{pi}, y))$.

Note that if $p = p_i$, then the decryption of $c_i$ outputs the nonce N originally encrypted by the client.

The (shuffled) list L of ciphertext-label pairs is sent to the client. If $p \in D_S$, the client uses the random oracle applied to the nonce N in order to identify a ciphertext $c_j$. By decrypting $c_j$ with $sk_p$, the client derives $N_S$. The client chooses a nonce $N_C$ as its contribution to the session key and sends it encrypted under the well-known server's identity ID. Note that the encryption routine uses the public parameters generated by the server. The ciphertext, therefore, can only be decrypted by the server that uses msk to derive $sk_{ID}$. Finally, both compute the common key from $N_S$ and $N_C$. In case the client's nonce N does not point to any ciphertext in L, it chooses $N_C = 0^{m(l)}$, to indicate to the server non-acceptance for the session, while keeping the transcript indistinguishable from a successful one.

It is easy to check that correctness is achieved with overwhelming probability. Note that it is possible that client and server do not share a password but they both accept with non-matching session keys. However this would happen only if the label l* computed by the client points to a ciphertext encrypted under $p_i \neq p$, which, in turn, it is only possible if either y decrypts to N under a "wrong" key or there is a collision for the hash function H. Both events occur only with negligible probability.

The APAKE protocol depicted in FIG. 3 achieves key secrecy in the sense of Definition 4 in the random oracle model, assuming IBE is a secure blind anonymous encryption scheme as defined in Meiklejohn et al. achieving Id-privacy in the sense of Definition 7. Furthermore, The APAKE depicted in FIG. 2 achieves client anonymity in the sense of Definition 5 and server anonymity in the sense of Definition 6 in the random oracle model, assuming the involved blind anonymous IBE scheme IBE is secure as defined in Meiklejohn et al. and achieves Id-privacy in the sense of Definition 7.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for anonymous password-authenticated key exchange (APAKE), wherein a server holds a set of valid passwords and a client holds a client password from the set of valid passwords, the method comprising:
  defining, by the server, public parameters and a master key;
  transmitting, by the server to the client, the public parameters;
  engaging, by the server, in an interactive protocol with the client, wherein the interactive protocol involves the public parameters, the master key, and the client password, wherein the interactive protocol enables the client to derive a decryption key associated with the client password, wherein the interactive protocol does not allow the server to identify the client password and does not allow the client to determine the master key or to learn any information on the set of valid passwords;
  securely transferring, by the server to the client, an encrypted server nonce and an encrypted symmetric encryption key, wherein the decryption key derived by the client enables the client to decrypt the server nonce and the symmetric encryption key;
  receiving, by the server from the client, ciphertext including a client nonce encrypted with the symmetric encryption key;
  deciphering, by the server by using the symmetric encryption key, ciphertext received from the client to recover the client nonce; and
  computing a common key, which is shared between client and server, based on the client nonce and the server nonce.

2. The method according to claim 1, wherein the interactive protocol is an oblivious pseudo-random function (OPRF).

3. The method according to claim 2, wherein the public parameters are generated by a randomized algorithm that partially defines the OPRF.

4. The method according to claim 1, wherein the symmetric encryption key is derived from a symmetric encryption scheme defined by a triplet of algorithms.

5. The method according to claim 4, wherein the triplet of algorithms includes:
  a first algorithm that is a randomized algorithm that outputs the symmetric encryption key,
  a second algorithm that is a randomized algorithm that outputs, based on the symmetric encryption key and the client nonce, the ciphertext, and
  a third algorithm that is a deterministic algorithm that outputs, based on the symmetric encryption key and the ciphertext, the client nonce.

6. The method according to claim 1, wherein the server computes, for each password in the set of valid passwords, a corresponding password tag by using the master key.

7. The method according to claim 6, wherein the server maps each password tag to the symmetric encryption key using a cryptographic hash function to provide, for each password in the set of valid passwords, a password key.

8. The method according to claim 7, wherein the server encrypts the server nonce and the symmetric encryption key with each password key to generate, for each password in the set of valid passwords, a ciphertext.

9. The method according to claim 8, wherein the server initializes an empty associative array, stores the ciphertexts in the array, and sends the array to the client.

10. The method according to claim 9, wherein the decryption key derived by the client enables the client to decrypt the server nonce and the symmetric encryption key from an index in the array sent by the server.

11. The method according to claim 1, wherein the interactive protocol is an oblivious programmable pseudo-random function (OPPRF).

12. A non-transitory computer readable medium having stored thereon instructions for performing a method for anonymous password-authenticated key exchange (APAKE), wherein a server holds a set of valid passwords and a client holds a client password from the set of valid passwords, the method comprising:
  defining, by the server, public parameters and a master key;
  transmitting, by the server to the client, the public parameters;
  engaging, by the server, in an interactive protocol with the client, wherein the interactive protocol involves the public parameters, the master key, and the client password, wherein the interactive protocol enables the client to derive a decryption key associated with the client password, wherein the interactive protocol does not allow the server to identify the client password and does not allow the client to determine the master key;
  securely transferring, by the server to the client, an encrypted server nonce and an encrypted symmetric encryption key, wherein the decryption key derived by the client enables the client to decrypt the server nonce and the symmetric encryption key;
  receiving, by the server from the client, ciphertext including a client nonce encrypted with the symmetric encryption key;
  deciphering, by the server by using the symmetric encryption key, ciphertext received from the client to recover the client nonce; and
  computing a common key, which is shared between client and server, based on the client nonce and the server nonce.

13. The non-transitory computer readable medium according to claim 12, wherein the interactive protocol is an oblivious pseudo-random function (OPRF).

14. The non-transitory computer readable medium according to claim 13, wherein the public parameters are generated by a randomized algorithm that partially defines the OPRF.

15. A server for performing anonymous password-authenticated key exchange (APAKE), the server having access to a memory configured to store a set of valid passwords, the server comprising one or more processors, which alone or in combination, provide for execution of a method comprising:
  defining public parameters and a master key;
  transmitting, to a client storing a password from the set of valid passwords, the public parameters;
  engaging in an interactive protocol with the client, wherein the interactive protocol involves the public parameters, the master key, and a client password, wherein the interactive protocol enables the client to derive a decryption key associated with the client password, wherein the interactive protocol does not allow the server to identify the client password and does not allow the client to determine the master key or any other information about the set of valid passwords;
  securely transferring, to the client, an encrypted server nonce and an encrypted symmetric encryption key, wherein the decryption key derived by the client enables the client to decrypt the server nonce and the symmetric encryption key;
  receiving, from the client, ciphertext including a client nonce encrypted with the symmetric encryption key;

deciphering, by using the symmetric encryption key, ciphertext received from the client to recover the client nonce; and computing a common key, which is shared between client and server, based on the client nonce and the server nonce.

* * * * *